(12) United States Patent
Schwartz

(10) Patent No.: US 6,215,901 B1
(45) Date of Patent: *Apr. 10, 2001

(54) PEN BASED COMPUTER HANDWRITING INSTRUCTION

(76) Inventor: Mark H. Schwartz, 4089 Aberdeen Ct., Orchard Lake, MI (US) 48323

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,242

(22) Filed: Mar. 7, 1997

(51) Int. Cl.$^7$ .................................................. G06K 9/18
(52) U.S. Cl. ........................ 382/186; 382/187; 382/189; 434/161; 434/165
(58) Field of Search .................. 382/185, 186, 382/188, 120, 121, 122, 187, 189, 190, 195, 199, 200, 202, 203, 286; 434/158, 159, 160, 161, 162, 165, 260, 155, 167, 169; 33/27.03; 178/19.01, 19.04, 19.05; 345/179, 171, 16, 17, 23, 25, 180, 327, 473

(56) References Cited

U.S. PATENT DOCUMENTS

| Re. 34,476 | * | 12/1993 | Norwood | 382/187 |
|---|---|---|---|---|
| 3,778,910 | * | 12/1973 | Smalligan | 35/37 |
| 4,070,544 | * | 1/1978 | Lambden | 178/18.05 |
| 4,464,118 | * | 8/1984 | Scott et al. | 434/85 |
| 4,633,436 | * | 12/1986 | Flurry | 434/162 |
| 4,971,560 | * | 11/1990 | Patel | 434/191 |
| 5,040,222 | * | 8/1991 | Muroya | 382/123 |
| 5,040,986 | * | 8/1991 | Cohen | 434/162 |
| 5,063,600 | * | 11/1991 | Norwood | 382/186 |
| 5,111,004 | * | 5/1992 | Gullman | 178/19.04 |

(List continued on next page.)

OTHER PUBLICATIONS

Thurber, Donald N.; D'Nealian Manuscript–A Continuous Stroke Approach to Handwriting; one page.

Foresman, Scott; Teaching Handwriting–A Conversation with Donald N. Thurber, Author of the D'Nealian Handwriting Program K–8; 4–page pamphlet.

Foresman, Scott; D'Nealian Handwriting; 12–page pamphlet.

Foresman, Scott; Issues in Handwriting; Research: Handwriting Issues and Special Needs by Dr. Dale R. Jordan; 6–page pamphet.

Brewer, Dr. Neil and White, J.M.; Computerized handwriting instruction with severely mentally handicapped adults; pp. 37–44 of *Journal of Intellectual Disability Research*, 1994.

(List continued on next page.)

*Primary Examiner*—Amelia Au
*Assistant Examiner*—Timothy M. Johnson
(74) *Attorney, Agent, or Firm*—Harness, Dickey & Pierce, P.L.C.

(57) ABSTRACT

A method and system for performing instruction of handwriting skills by animated display of the required stroke motions with simultaneous audio verbal description of these same motions, including the means for a student to practice this lesson with use of a pen based input device by which the pen motion is captured, displayed on a computer monitor, and communicated to an evaluation algorithm which rates the quality of the writing. Based on this handwriting evaluation, the system includes means to provide visual and auditory reward, and generate the subsequent instructions and exercise for the student using embedded expert teaching knowledge. In the preferred embodiment, a tablet with a fastening mechanism fixes into position the paper duplicate of the handwriting lesson presented on the computer screen and the pen writing device is a special ballpoint pen capable of leaving a hard copy trace of the student writing.

13 Claims, 5 Drawing Sheets

U.S. PATENT DOCUMENTS

| | | | | |
|---|---|---|---|---|
| 5,174,759 | * | 12/1992 | Preston et al. | 434/317 |
| 5,337,484 | * | 8/1994 | Cardon | 434/117 |
| 5,420,943 | * | 5/1995 | Mak | 382/313 |
| 5,442,715 | * | 8/1995 | Gaborski et al. | 382/187 |
| 5,506,617 | * | 4/1996 | Parulski et al. | 348/207 |
| 5,517,578 | * | 5/1996 | Altman et al. | 382/181 |
| 5,533,147 | * | 7/1996 | Arai et al. | 382/202 |
| 5,596,656 | * | 1/1997 | Goldberg | 382/186 |
| 5,596,698 | * | 1/1997 | Morgan | 382/186 |
| 5,600,779 | * | 2/1997 | Palmer et al. | 395/340 |
| 5,730,602 | * | 3/1998 | Gierhart | 434/162 |
| 5,734,750 | * | 3/1998 | Aria et al. | 382/202 |
| 5,734,882 | * | 3/1998 | Lopresti et al. | 382/100 |
| 5,757,959 | * | 5/1998 | Lopresti | 382/186 |
| 5,784,501 | * | 7/1998 | Tanaka | 382/286 |
| 6,064,766 | * | 5/2000 | Sklarew | 382/189 |

OTHER PUBLICATIONS

Sansom, D.T., Singh, I., Jawed, S.H., Mukherjee, T.; Elderly people with learning disabilities in hospital: a psychiatric study; p. 45 of *Journal of Intellectual Disability Research*, 1994.

Lally, Mike and Macleod, Iain; Development of skills through computers: achieving an effective, enjoyable learning environment; Impact *of science on society*, vol. 32, No. 4, 1982, pp. 449–460.

Lally, Mike and Maclean, Iain; 19. The promise of micro–computers in developing basic skills; World Yearbook of Education 1982/1983 Computers and Education; pp. 194–205.

Roberts, Gwenyth I. and Samuels, Marilyn T.; Handwriting Remediation: A Comparison of Computer–Based and Traditional Approaches; *Journal of Educational Research*; Nov./Dec. 1993 [vol. 87(No. 2)]; pp. 118–125 plus 1–page of Among Those Present.

* cited by examiner

1. "Here is the letter 'a'. Always start by the dot, and follow the arrow's direction. Say and write:"

2. "Middle start"

3. "Around down"

4. "Close up"

5. "Down"

6. "And a monkey tail!"

Figure 6 Comparison of ideal and test (handwritten) "a" characters

| IDEAL CHARACTERISTICS | Quality Rating | TEST CHARACTERISTICS | Quality Rating |
|---|---|---|---|
| ```
    1111111
   11      1
  11        1
 1          1
 1         11
1          11
11         11
11        111
1         1 1
1        1 11
1       11 1    1
1   1      1   1
  111       1111
```<br>pbmimg/la00.pgm | A | ```
    111
   111  11
  11     1
  1     11
  1     1
  1     11
  1     1
  1     11
  1     11
  1    1 1
  1111   1
```<br>pbmimg/la201.pgm | C |
| SIZE ATTRIBUTE | | | |
| rows = 25 cols = 29 | A | rows = 23 cols = 14 - Small | C |
| SLANT ATTRIBUTE | | | |
| angle = -27° | A | angle = -17° - Small | C |
| SHAPE ATTRIBUTES | | | |
| Aspect Ratio = 0.862 | A | Aspect Ratio = 1.643 - Small | C |
| ZERO Crossings | | ZERO Crossings | |
| zcmx=4 zcmn=1 zcav= 2.44 | A | zcmx=3 zcmn=1 zcav= 1.91 | C |
| zone[0]= 1.86 zone[1]= 2.00 | A | zone[0]= 1.88 zone[1]= 2.00 | A |
| zone[2]= 2.43 zone[3]= 3.43 | A | zone[2]= 2.00 zone[3]= 1.88 | C |
| WIDTH | | WIDTH | |
| wp[0]=12.14 wp[1]=17.43 | A | wp[0]= 7.63 wp[1]= 8.75 | C |
| wp[2]=19.14 wp[3]=22.29 | A | wp[2]= 8.75 wp[3]= 6.63 | C |
| OVERALL RATING | A | | C |

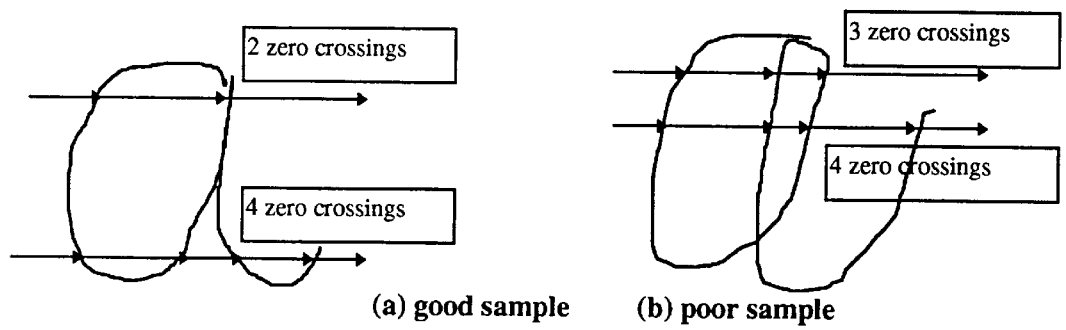
Fig. 7 Zero Crossings on a Horizontal Scan for the Letter 'a'
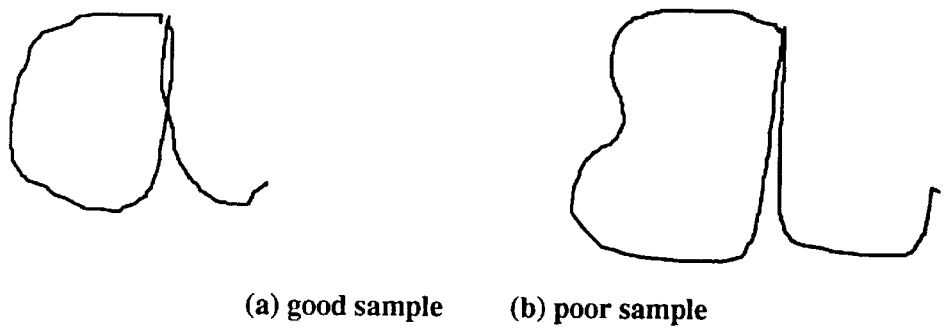
Fig. 8 Width Distribution Across the Height for the Letter 'a'

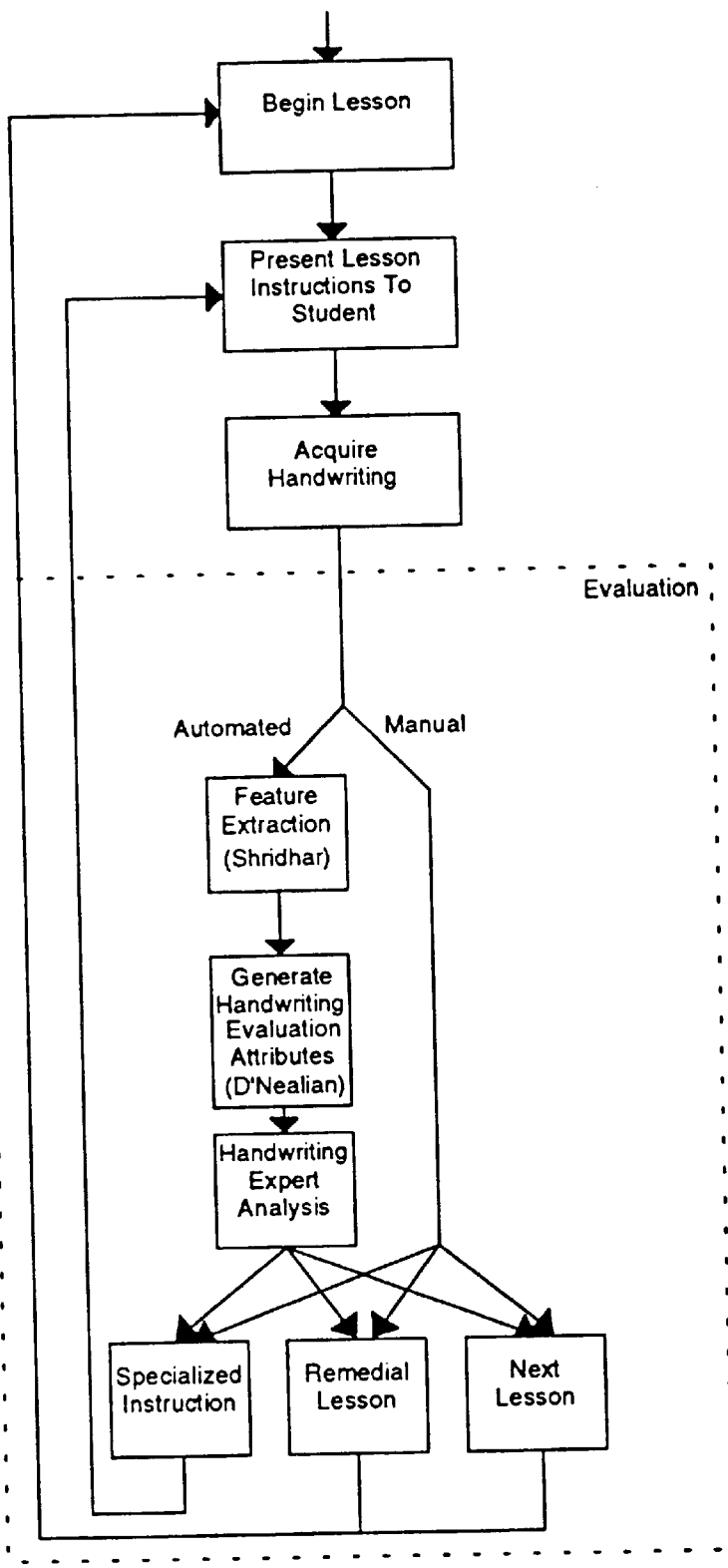
Fig. 9 System Operation Flow Diagram

PEN BASED COMPUTER HANDWRITING INSTRUCTION

BACKGROUND OF THE INVENTION

1. Field of the Invention

This invention relates generally to EDUCATIONAL AND DEMONSTRATION SYSTEMS for use with computers and other information processing systems. Particularly, the present invention relates to the teaching of WRITING OR PRINTING BY HAND. More particularly, the present invention relates to a system and method for teaching of handwriting or penmanship using a digital computer interfaced to a pen or stylus input device with software for providing instruction and guidance on letter formation. Such a system will be useful for supplementary classroom instruction, the self-instruction of students at home, and remedial education of students with learning/motor disabilities in both manuscript and cursive writing styles.

For the purposes of this present invention, pen based computer refers to a computer which has a special electronic pen or stylus which can function as an input device. In the preferred embodiment there is a tablet associated with the pen device which electronically senses and acquires information about the pen tip motion for communication to the computer software.

2. Description of the Prior Art

Various systems are known for use in teaching handwriting skills. The simplest such systems use a book of worksheets with printed letter samples serving as templates to be traced over by the student using a conventional pencil or pen. By having the student trace a number of letters, the student is expected by repetition to gain the habit of correct letter formation. However, this system requires a human teacher to recognize if the student is forming the letters properly. Cohen in U.S. Pat. No. 5,040,986 discloses a device to assist in teaching children to write with proper shaped letters by controlling their pen motion by mechanical means. While the student is thus ensured of forming the arcs "programmed" by the device by orientation of its apertures, pen movement is practiced in a physically constrained space so that motions practiced may not be "learned" or translate into improved ability to perform unrestricted writing. Cohen's device also concentrates on the teaching of "arcs" rather than teaching the writing of whole letters or even words.

Prior art in image analysis includes pattern recognition systems which perform recognition of handwritten characters. Gaborski et al. in U.S. Pat. No. 5,442,715 discloses a method and apparatus for cursive script recognition. This invention reads handwritten text but it is not designed as a teaching device. Therefore, individual characters or whole words are recognized and the contents of the text read by the apparatus is output, but there is no feedback given to the writer concerning the "quality" of the handwriting. Muroya in U.S. Pat. No. 5,040,222 describes a method for comparing handwritten signatures with a previously stored template and calculating the variation or "distortion" between them. However, the variation calculated in this invention measures deviation from an individual's own signature which is then used to determine writer identification. Because the writing comparison is not performed against a template of ideal character templates, it does not measure absolute quality of the writing, and cannot be used for handwriting instruction.

The prior art further includes computer programs which employ electronic handwriting instruments and writing surfaces for acquisition of the pen motion information. Lally and Macleod (1982,1983) used a computer controlled display screen in conjunction with a digitizer pen. When the student correctly traced a thin guideline on the screen consisting of a 512 by 512 array of controllable neon lights, the display of the line was thickened. The thickening would cease and a cursor would blink to indicate deviation of the pen tip beyond an established set standard from the true path. For the teaching of handwriting, this system has the advantage of showing the student the pen path as it is written, however, this path this invention displays is unnatural in that it stops even though the hand motion continues. Although for this invention the potential motion of the pen is not physically constrained, it does rely on use of a light pen very dissimilar from a conventional pencil or ball point pen usually used by students in school. Roberts and Samuels (1993) modified this system by implementing it on a personal computer platform using a graphics tablet as the input and utilizing the computer monitor for display of the pen path motion. The major improvement of the Roberts and Samuels over the Lally and Macleod device is that the electronic pen is more similar to a conventional pen. However, a disadvantage is introduced in that the student user is forced to look up from the writing tablet to the computer screen for visual feedback of the actual pen path.

All of the above devices are deficient in their ability to serve as a platform for automatic instruction of handwriting. Prior art does not provide for integrated display of instructions for proper pen motion via animated display and associated audio. Also, equipment for these methods does not allow use of a conventional writing instrument therefore they do not provide a realistic display to the student of their actual writing. Prior art also uses a means for letter evaluation which strictly relies on a simple deviation from the model template. This evaluation is therefore not in keeping with current standards of handwriting teaching and evaluation which require evaluation of the "whole" letter.

OBJECTS AND SUMMARY OF THE INVENTION

1. Objects of the Invention

In view of the above state of the art, the present invention seeks to realize the following objects and advantages.

It is a primary object of the present invention to provide a computer system for the teaching of handwriting which demonstrates penmanship instruction using multi-media or audio and synchronized animated video.

It is also an object of the present invention to provide a pen based input peripheral device that can be used to practice the instructed handwriting exercise.

It is another object of the present invention to provide a tablet associated with the pen input device which provides a clamp or clip to hold a sheet of writing paper in a fixed position and orientation. The pictures and graphics on this instruction sheet duplicate the appearance of identical graphics displayed on the computer screen or monitor.

It is another object of the present invention to provide interface software which uses digital data acquisition to capture the pen tip motion information from the pen writing on the tablet and displays a duplicate of the pen trace on the computer screen. Thus, this invention allows the writer to see the pen path with an electronic image display on both the conventional paper copy and the computer monitor.

It is another object of the present invention to provide computer software which automatically analyzes the handwriting input and rates its quality in terms of predetermined criteria. These criteria take into account the whole letter or word formation in terms of shape, size, slant, and spacing but can be adjusted or modified to suit any handwriting system.

It is another object of the present invention to provide positive feedback and encouragement to the writer for successful completion of an exercise and remedial recommendation based on the automated analysis of the handwriting sample.

It is a further object of the present invention to provide a portable pen based tablet device that can be interfaced to conventional personal computers and is fully automated and provides more robust functions than a simple handwriting workbook or computer tracing program for letters.

These and other objects and advantages of the present invention will become more apparent from the description and claims which follow, or may be learned by the practice of the invention.

2. Summary of the Invention

The present invention is a pen based computer handwriting instruction method and system. The educational device of the present invention comprises a multi-media computer which demonstrates the proper formation of handwriting strokes, letters, or numerals using both audio and synchronized animated video and a pen based input device and associated planar tablet, having a surface which supports thereon a sheet-like member having an inscribable surface, which converts the movement of said pen tip into an electronic signal suitable for transmitting and communicating said signal to said microprocessor based computer system; wherein the handwritten strokes are displayed on the computer monitor and the computer software evaluates these strokes for correct formation according to prescribed criterion and provides positive feedback and/or remedial instruction based on the deviation from the handwritten strokes from the said established criterion.

The present invention to acquire the written stroke information may use a variety of types of pen and tablets wherein said pen based input devices are at least one or more pressure sensitive, magnetic, electromagnetic or optically actuated device.

To maintain similarity to the conventional writing process the contact point of the said pen based input device will incorporate a conventional ball point pen or lead pencil tip so that the system user creates a copy of their writing with a feel similar to conventional writing.

The tablet associated with the pen based input device reversibly holds in fixed orientation a paper worksheet containing the graphics illustrating the particular handwriting lesson which appears on said computer monitor. The use of said paper worksheet ensures creation of a hard copy of the handwriting and allows the system user to perform the handwriting with the physical feel of the hardware most similar to conventional handwriting.

In order to maintain orientation of the said worksheet and allow the software to display a video reproduction of said writing on said computer monitor in proper orientation to that of the actual writing, the tablet incorporates a clip, clamp, fixed posts, or other mechanism.

The evaluation of the handwriting is performed by the computer software in the preferred implementation in terms of letter size, shape, slant, and spacing. This whole letter and whole word evaluation of the handwriting sample ensures that the negative feedback given to the system user or writer is not based on simple calculation of distance or deviation of writing from a fixed template but on more general measures of writing legibility. This evaluation method allows adherence to the handwriting principles of the D'Nealian system for handwriting instruction and is more suitable for teaching to students with learning or motor disabilities.

3. Recognized Variations

It will be recognized by one versed in the art that any of the 3 following variations are encompassed within the scope of the invention although not specifically claimed as a fundamental principle of the teaching of the invention.

The writing tablet and computer monitor can be the same device such as a pressure sensitive liquid crystal display so that the writing and display occur simultaneously on the same hardware device.

The pen and tablet may communicate with the computer processor by one of a variety of wireless transmission and communication techniques such as infrared or RF.

The multi-media letter instruction and handwriting evaluation criteria may be modified to conform to other handwriting educational methodologies such as Zaner-Bloser, or Palmer.

BRIEF DESCRIPTION OF THE DRAWINGS

FIG. 6 is table showing comparison of ideal and test (handwritten) "a" characters; and FIG. 7 is a diagram of zero crossings on a horizontal scan for the letter "a" in accordance with an embodiment of the present invention; and FIG. 8 is diagram of width distribution across the height for the letter "a" in accordance with an embodiment of the present invention.

FIG. 9 is a system operation flow diagram for presenting and evaluating handwriting lessons.

DETAILED DESCRIPTION OF THE INVENTION

Reference will now be made to the drawings wherein like structures will be provided with like reference designations.

Hardware Overview of the Preferred Embodiment

Figure 1:
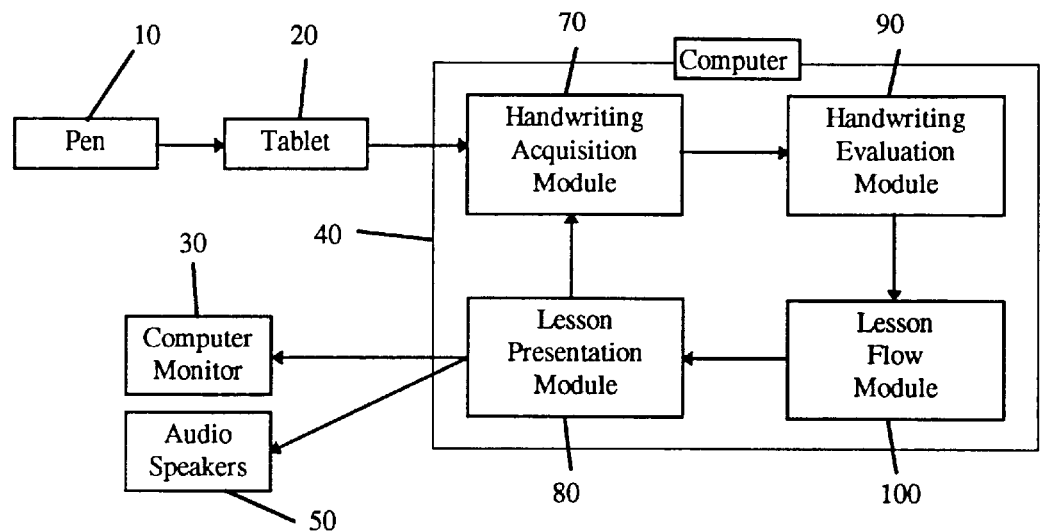
FIG. 1 is a block diagram of the instructional system for teaching handwriting in accordance with an embodiment of the present invention.

Referring to FIG. 1, the apparatus of one embodiment of the pen based computer handwriting instruction device in accordance with the present invention includes a pen 10, planar writing tablet 20, computer display 30, computer 40, and audio speakers 50.

Pen 10 is a handheld writing instrument or implement preferably of similar shape and weight to a conventional ballpoint pen or lead pencil. Pen 10 interacts with planar writing tablet 20, such that when relative motion is made between the tip of the writing instrument and the planar tablet the motion of the pen tip alters the electrical signals communicated by the tablet 20 to the computer 40. The surface of tablet 20 can be sensitive to changes in light, pressure, magnetic field disturbances or some other interaction means for capturing the movement of pen 10. Preferably the pen 10 is cordless and not physically connected to tablet 20 so that it can be moved freely and with no restrictions. More preferably, pen 10 contains a conventional ballpoint tip or actual graphite lead capable of leaving a mark on a paper worksheet 65. For example, the WideBody UltraPen with Ink (Model UP-401) or WideBody UltraPen with Pencil (Model UP-501) from Wacom, Inc. (Vancouver, Wash.) may be used.

Writing Implement and Surface of the Preferred Embodiment

Figure 2:
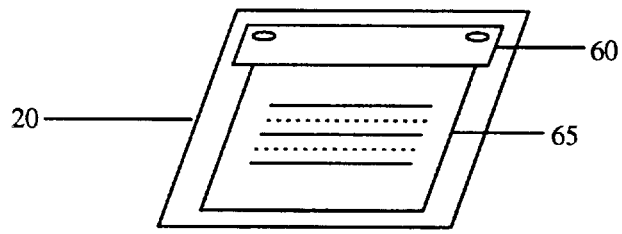
FIG. 2 is a block diagram for the writing tablet and paper worksheet arrangement in accordance with the present invention.

Referring to FIG. 2, tablet 20 is adapted to have an attached clip 60 which can reversibly hold paper worksheet 65 in a fixed position. Preferably, clip 60 contains tabs and stops to assist the user in guiding worksheet 65 into proper position. More preferably, the lower flange of clip 60 is integral to the construction of tablet 20 so that it lies flush with the surface. The clip 60 then is closed down over the worksheet 65 with guide posts in the clip top going through holes in the worksheet 65 locking it in place. This contiguous flat configuration of tablet 20 and clip 60 ensures that worksheet 65 will lie flat without gaps against the tablet 20 and because it is secured in place by the clip 60, the relative motion between worksheet 65 and tablet 20 is minimized when an operator writes on the tablet using pen 10.

Tablet 20 is preferably of sufficient size to hold in place an 8½ inch by 11 inch worksheet. More preferably the tablet 20 will acquire movement of the pen 10 with sufficient speed and resolution to capture a likeness of the written pen strokes. Capture of pen tip movements at greater than 30 points per second ensures this density of pen tip information. The ArtZ II (Model UD-1212-RSB) from Wacom, Inc. (Vancouver, Wash.) may be used as tablet 20 because it is about 16 inch by 16 inch in dimension so that worksheet 65 can be centered on the active region of the top surface of tablet 20 and writing with pen 10 anywhere on the worksheet 65 will be electronically captured by the tablet 20 and communicated to computer 40. Moreover, this tablet is able to capture pen tip motion at 60 points per second.

Software Overview of the Preferred Embodiment

Referring to FIG. 1, computer 40 contains a software program which comprises a plurality of separate modules for performing the handwriting instruction. In one preferred embodiment, signals communicated by tablet 20 are transferred through a serial connection to computer 40. The handwriting acquisition module 70 converts the data from the tablet 20 into stroke and point information. In the case when the apparatus of the invention is being used to teach manuscript printing, the handwriting acquisition module 70 uses its ability to recognize pen up and pen down movements to separate the data based on these events. The point information between each pen down and pen up event forms a stroke. Depending on the data acquisition rate of the pen and tablet hardware, the information for each pen stroke consists of a variable number of location points. This information data on the location of the tip of pen 10 at a number of times between the stroke down and stroke up are communicated to the lesson presentation module 80 which calculates the information to send computer display 30 so that it displays the digitized points connected by line segments causing a close reproduction on the computer display 30 giving for example the drawing of a letter on the worksheet 65.

Lesson Presentation Module

Lesson presentation module 80 presents lesson instructions to the operator using sound by communicating with a sound board which outputs these sounds on audio speakers 50 and communicates with the computer monitor 30 to display the static and animated graphics constituting the handwriting lessons and exercises. Conventional penmanship teaching materials show the student a static picture of what a proper letter should look like, and may in some cases give numbered arrows to show the sequence of strokes to be followed in letter creation. However, it remains for the teacher to actually demonstrate the stroke mechanics. This is, of course, because the dynamics of letter writing can not be conveyed by a fixed picture, or even a series of pictures. In this embodiment of the invention, lesson presentation module 80 initially presents lessons teaching a student the correct posture and hand position for handwriting, how to grip their pen, and provides demonstrations on how to correctly write numerals, the upper and lower case letters, and words using the optimal stroke sequences for letter formation techniques of some standardized handwriting system. Preferably, the standardized system is the D'Nealian system which seeks to improve the teaching of handwriting by simplifying the letter templates and by reducing the number of strokes necessary to form these letters.

The handwriting evaluation module 90 evaluates the student's writing data from the tablet, by extracting features from the individual characters and combines them into main attributes. In the present embodiment there are 4 main attributes consisting of size, shape, slant, and spacing from which are formed an overall evaluation of the handwritten letter and based upon which the handwriting evaluation module 90 creates new instructions for the student regarding what to do differently.

The lesson flow module 100 modifies the lesson presentation module 80 instructions for the student accordingly, and the next sublesson is started. Once the handwriting evaluation module 90 determines "enough" sublessons of the lesson have been completed, the handwriting evaluation module 90 decides what lesson to go to next. This may be the next predetermined lesson, or a remedial lesson to bolster certain problem areas. The lesson flow module 100 carries out these instructions and moves the lesson presentation module 80 on to the designated lesson.

Display Screen and Worksheet Layout of the Preferred Embodiment

Figure 3:
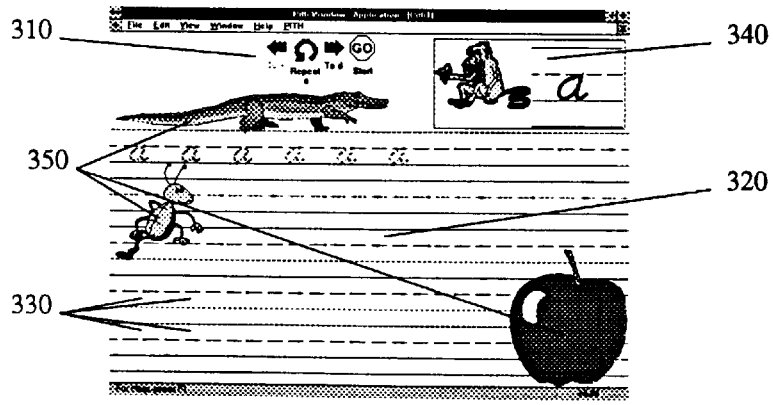
FIG. 3 is a representative screen layout for lesson on the letter "a" in accordance with an embodiment of the present invention.

In one embodiment, the graphics on the printed worksheet 65 and the workspace that the lesson presentation module 80 displays on the computer display 30 both consist of several corresponding regions. In the case of the worksheet 65, the images are static and the student writes directly on the sheet itself, however the image on the computer display 30 is animated and reflects the writing done on the tablet. FIG. 3 depicts the general lesson layout that appears on a worksheet 65 and on corresponding computer display 30. The student controls program flow by touching the pen 10 to one of the buttons in the control area 310.

The largest region on the computer display 30 is the practice area 320 which is the onscreen area in which the strokes created using the pen 10 and tablet 20 are displayed. Inside the practice area 320 are some example letters for the student to trace as a starter, along with blank start points 330 at which to write more letters. Above that, in the upper-right corner, is the instruction area 340 where the instructional visual is presented, surrounded and offset by a box. Encouragement or positive feedback to the student for good performance is provided by specific computer generated comments about letter quality and letter formation technique. Incentive and motivation for the student to make diligent progress is provided with audio sound effects and visual special effects as a direct reward for successful completion of an exercise. In this embodiment, in the practice area 320 and above it too are colorful sound pictures 350 that produce entertaining sounds, when touched with the pen and activated after the student has completed an exercise.

Control Area

Figure 4:
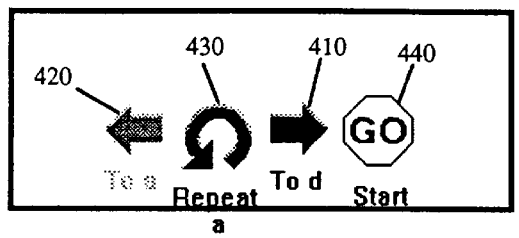
FIG. 4 is the control area which appears on the computer display for manual lesson flow control in accordance with an embodiment of the present invention.

Referring to FIG. 4, in the control area 310, the forward button 410 proceeds to the next lesson. The backward arrow 420 returns to the previous lesson. Pressing on the circular arrow 430 will repeat the current lesson for the student. When the student presses on the start button 440 the audio and animated video instruction for the lesson is begun.

Instruction Area

In the instruction area 340, the animated instruction for the lesson appears and is synchronized with the audio directions. The instructional audio-visual animation plays in the upper-right corner of the screen. This area consists of a taller, short writing line on which is placed a proportionally larger picture of the lesson's letter. Often there will be a picture just to the left of this area that is involved in the instructional animation.

The motion the student should follow to correctly form the letter according to the particular handwriting system being trained is synchronized in animation with the audio instructions. The student can tap on the start button 440 again to hear the instructions again.

A full instructional animation sequence consists of several "clips", each one corresponding to a handwriting step in letter formation (for example, the "around down" step in the letter "a".) The clip provides a visual and auditory description of that step. The sequence (the full set of clips) for each letter begins with a verbal lead-in that prompts the child to "say and write" the handwriting instructions that will follow. In this embodiment, the sequence plays once, and then the sequence plays again once more, at a slightly faster animation rate. When the second play ends, it is time for the child to begin tracing and then writing the letter.

Animation Clips

A typical animation clip will contain several components. The first will be a curved "track" that describes the path the pencil should take when forming the letter. The track is located a small distance away from the part of the letter it represents. The track has a "beginning" and an "end", which correspond, respectively, to the places where the pencil starts and ends the formation of that part of the letter. The second clip component is an arrow head that starts at the beginning of the track and, through several animation frames, moves along the track to the end. The third component is the auditory instruction that describes the motion that is occurring along the track, such as in the "around down" beginning of the letter "a". Unless it is one of a few exceptions, each clip plays the audio instruction once, and repeats the track path twice.

Figure 5:
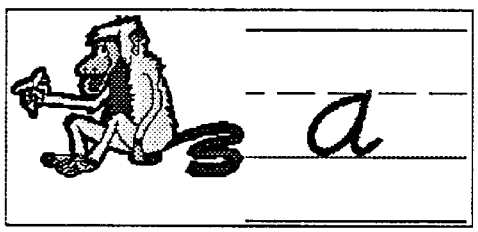
FIG. 5 is a sequential sequence or animation clip for instruction of the letter "a"
Figure 5:
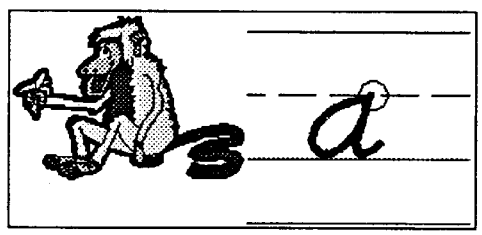
Figure 5:
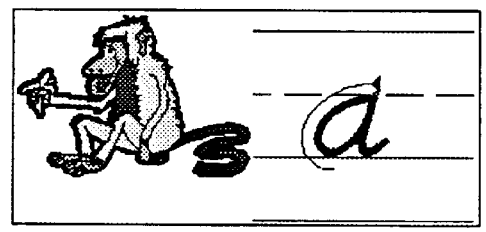
Figure 5:
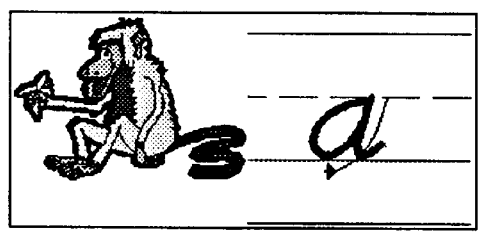
Figure 5:
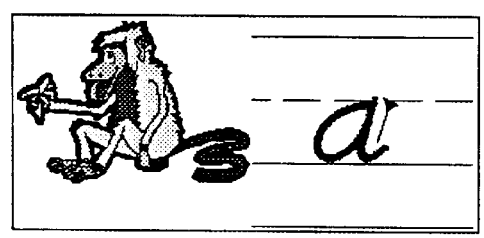
Figure 5:
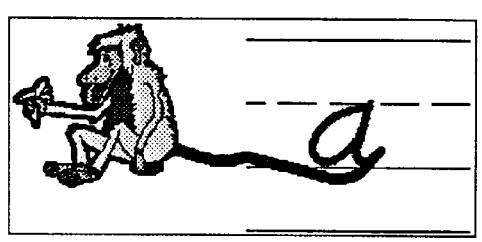

In the preferred embodiment, the handwriting instruction implemented is for the D'Nealian handwriting system. For implementation of this embodiment, there are four special animation clips that are used for teaching the letters in the program. These correspond to D'Nealian instructions of special significance that are exploitable in an entertaining way. The first of these is a clip that corresponds to the "monkey tail" description. This description is for the formation of the cursive-like "tail" coming off the bottom-right of letters like "a" and "d". The clip takes advantage of a monkey picture placed to the left of the letter. When the D'Nealian instructions for these letters come to the "monkey tail" part, the monkey extends his tail and wags the tip of it over the "monkey tail" of the letter. The tail tip is in the shape of the letter's "monkey tail", and overlays it, with the letter's "monkey tail" appearing underneath. Referring to FIG. 5 gives an example of this program feature for the letter "a". The D'Nealian instruction sequence for the letter "a" consists of 6 separate commands. In this embodiment, for example, for the letter "a", the audio track says "middle start; around down, close up, down, and a monkey tail" while an animated arrow traces each of these pen motions. Therefore the animation clip consists of 6 separate commands. FIG. 5 shows for this embodiment, the first animation frame from each sequence along with the full text of the audio track that plays through the clips shown below each picture.

In this embodiment, the second special clip corresponds to the lower-half of the letter "s". After the first two D'Nealian instructions with track-and-arrows, a colorful rattlesnake, placed similarly to the monkey, extends his tail. The tail overlays the s in an "s" shape from the top downwards, with the tip at the bottom-left end. The tip, a rattle, wags back and forth as "and a snake tail" plays aurally.

In this embodiment, the third special clip is used in letters like "g" that have a part that moves down under the bottom line to the descender area. The D'Nealian instruction to play this is "down under water", and indicates the pencil should pass through the bottom line and down towards the descender line. The animation clip consists of a standard arrow following an animation track, but in this case, as the arrow approaches the bottom line from above, the descender area darkens into blue water. As the arrow "hits" the water, an animated splash occurs and rings expand outwards along the surface of the "water".

In this embodiment, the fourth special clip is used to play the curved descender of letters like "g". The D'Nealian instruction to play this descender is "a fishhook". When it's time for this instruction, a specially-placed fisherman in a boat casts his hook out. The hook overlays the g's descender, and slides up and down over it, emphasizing the hook-like shape of the g's descender.

Practice Area

Referring to FIG. 3, in this embodiment, the student can begin writing at any time in the practice area 320. The practice area typically consisting of several rows of standard writing lines. Each writing line has a solid top and bottom line, in blue, and a dashed, red middle line. The solid top line of the next writing line down also serves as the previous writing line's descender line, and is used for letters with descenders (like the letter "g".)

At the beginning of the first writing line are three light-colored examples of the letter to be formed. To their right are three light-colored, dashed examples of the same letter. The student traces the three solid examples, and then traces the three dashed ones. After that, the student will draw, with no tracer underneath, the letter at various blank points shown along the writing lines. Start points 330 give the recommended start position for each of the letters.

In this embodiment, interspersed through and above the writing lines are several colorful sound pictures 350. When a line is completed, the student is rewarded by being able to activate one of these. Each of these pictures plays a short, entertaining sound. By tapping the pen on a sound picture an amusing sound effect is played as a positive reward to the student for completing that task. Each lesson has 3 general locations for sound pictures, with the topmost activated after the student completes the top row. The left sound picture is activated when rows 2 and 3 are completed. The student can select the right sound picture when they have completed rows 4 and 5. If the student selects a sound picture before completing its corresponding row(s) the audio instruction will say for example "You must complete all the items in rows 4 and 5 to hear the apple sound". As this audio track is played the start points 330 for the incomplete rows 4 and 5 are flashed on the computer display 30.

Lesson Flow Module

In this embodiment, the lesson flow module 100 controls the movement of the child through the lessons and sublessons, waits for completion of sublessons, invokes the handwriting evaluation module 90, and carries out the changes in lesson that the handwriting evaluation module 90 makes. The lesson flow module 100 guides the student along a suggested path from lesson to lesson. This sequence may be altered by manual intervention by the teacher, who can use onscreen controls to change to any lesson desired. If the suggested path is taken, however, this module will guide the student through lessons that are in a predetermined order.

A typical lesson begins when the child clicks on the "start" button with the pen tablet. This button is a green "stop sign" with the word "go" in it. The child will complete one sublesson at a time in order to get the "reward", which is the playing of sounds associated with various pictures onscreen. When each sublesson is completed (that is, when all the expected writing spaces are filled in) the lesson flow module recognizes this and sends the data off to the handwriting evaluation module.

When the student completes a letter the computer draws it on the video screen in the same size as the student wrote it. Once the student has written 3 letters, automatically evaluates these letters and offers encouragement or provides remedial instruction. For example the computer may point out that the letter is too large or small. The program then checks the next group of 3 letters the student writes and evaluates those.

Handwriting Acquisition Module

The handwriting acquisition module 70 gathers the handwritten information from the tablet and stores it for use by the handwriting evaluation module. In this embodiment the handwriting acquisition module 70 is built using the Microsoft PenWindows tablet-interface standard. The module consists of two parts: a "recognizer" dynamic-link library (.dll) to gather data, and a submodule of the present invention to control the recognizer and gather the data from it. The PenWindows Software Development Kit specification provides a standard way for application developers to interface with the many tablets on the market. It is oriented towards creating writing-input "recognizers" that convert tablet (or touch-screen) input into "standard" input, such as letters for word-processing programs, shapes for drawing programs, and so on. Since this data may be coming in a continuous stream (say, a long cursive word) the recognizer decides which parts of the stream correspond to the objects it seeks, and it breaks the incoming data into portions. The present invention does not use this "on the fly" quality of PenWindows, but uses a special recognizer that merely collects data one complete stroke at a time.

Inside the handwriting acquisition module 70 is a submodule that waits for a standard type of "event" (called a "left mouse button down" event.) If this button event is of a special "tablet" type, the submodule calls the recognizer, which gathers the data from the tablet, and which in turn notifies the submodule that it has completed the data gathering. The submodule collects the data from the recognizer, draws it onscreen at the location corresponding to the pen spot on the tablet's template overlay, and stores it for later use by the handwriting education system.

Handwriting Evaluation Module

The handwriting evaluation module 90 works by extracting features from the individual characters and combines them into main attributes from which is formed an overall evaluation of the handwritten letter. In this embodiment, the handwriting evaluation module 90 adopts the D'Nealian handwriting evaluation criteria which specifies that the main attributes for good handwriting formation are size, shape, slant, and for the writing of whole words—spacing.

In arriving at a score that measures the quality of a written character, the 3 attributes are evaluated by the handwriting evaluation module 90 submodule and scored against an ideal model of the character. Then a weighted average of the scores in each of the 3 categories is derived to arrive at the final score for the written character. This score is then categorized into one of three grade-like descriptions: A) Excellent B) Good and C) Average. With the goal of encouraging good writing, rating words such as "Poor" or "Bad" have been excluded, although certain writing might indeed be poor or bad.

Handwriting Evaluation Attributes

In this section, the evaluation of the three attributes: size, slant and shape will be described in terms of the how they are calculated from the extracted features. The primary requirement in this evaluation was the need for quantitative comparison of the attributes of a written character with those of the ideal character (often called the "template" or "prototype").

Evaluation of Size Attribute

In the present embodiment, the size of a character is evaluated by finding the size of the bounding rectangle that encloses the character. While, it is arguable that there are other more rigorous measures of size, the bounding rectangle was chosen to represent size, as it is easy to evaluate and adequate for the intended application. For example, in FIG. 6, it is seen that the ideal letter 'a' has a size of 25 rows×29 columns, while the handwritten test letter has a size of only 23 rows×14 columns, clearly indicating a problem in maintaining the correct size during writing.

Evaluation of Slant Attribute

In cursive writing, it is recommended that the letters be drawn with a slant to the right. Slant angles are typically in the range of 25° to 28°. Any major deviation from this range is considered to be unacceptable in the training phase. One could argue that the slant has no impact on the legibility or the shape of a character; however, the D'Nealian system considers it desirable to specify a standard for cursive writing. Cursive writing with a slant angle of 25° to 28° is more pleasing to the eye and is easier to read. Referring again to FIG. 6, the slant angle for the letter on the left represent is written well; while the letter shown on the right shows deviations from the accepted norm.

Evaluation of slant is based on image processing techniques. The chain code of the character image is determined first, using procedures found in most text books on image processing. It is noted that in digitized images, the chain code will typically have four distinct angles: 0°, 45°, 90° and 135°. Using this information, the average of the chain code angles is calculated and the slant angle determined. Although, the chain code computes angles in the range 0° to 315°, angle 0° is the same as 180°, since both indicate a horizontal direction. Similarly, angle 45° has the same orientation as 225° and angle 90° has the same orientation as 270° and the angle 135° is equivalent to the angle 315°.

Evaluation of Shape Attribute

Evaluation of shape attribute is the most critical component in the overall evaluation of a handwritten letter. Shape of any letter can be uniquely described by its curvature properties. Ideally, given the image of a character, one can define a curvature sequence, as one traverses the character from its starting position to the termination point. While there are many methods available to evaluate curvature of a given curve, the need to have simple shape measures that are easily evaluated and interpreted is crucial when training a child or a physically impaired person. In the present embodiment, the shape measures which are calculated are: Aspect Ratio, Zero Crossings Distribution, and Width Distribution. The shape attributes described by Aspect Ratio, Zero Crossings Distribution, and Width Distribution give very unique characterizations for all the letters of the alphabet.

Aspect Ratio deals with the overall height and width of the character. Aspect Ratio is determined by measuring the height and width of the rectangle that tightly encloses the character. As an illustration, if the size of the rectangle enclosing the letter 'a' is 25×29, then the Aspect Ratio is defined as:

Aspect Ratio=height/width

In the present embodiment, the ideal Aspect Ratio for a well written letter is defined and this measure used to compare with test letters written by the student.

Zero Crossings Distribution deals with the number of times, the character is encountered as one scans a given line horizontally. In the case of the letter 'a', one would typically encounter the character boundary twice in each row in the top portion, while this number will go to four in the lower region. The process of counting zero crossings is illustrated in FIG. 7. FIG. 7a illustrates the Zero Crossing Distribution for a good sample, while FIG. 7b shows a different Zero Crossing Distribution for a poor sample.

Width Distribution across the height of the character is a good indicator of how well the ideal shape of a character is reproduced by the writer. FIG. 8 illustrates this property for the letter 'a'. Width Distribution for the letter 'a' is small at the top, increases in the middle and shows a big increase in the lower region due to the terminal tail. FIG. 8a has these features. However, the poor sample shown in FIG. 8b shows how the Width Distribution is significantly different.

While preferred embodiments of the invention have been shown and described in detail, it will be readily understood and appreciated that numerous omissions, changes and additions may be made without departing from the spirit and scope of the present invention.

What is claimed is:

1. A handwriting instruction system for use by a student comprising:
    acquisition system for recording pen tip motion information corresponding to each of a plurality of individual strokes used to form a predetermined character input by said student;
    a feature extraction system that analyzes said pen tip motion information to extract features from said character input, said features selected from the group consisting of writing speed, pen tip pressure, timing between strokes, stroke quality, slant of characters, position of characters, and orientation angle of the pen;
    an attribute evaluation system that analyzes said features and that generates a set of handwriting attributes by combining said features into main attributes from which is formed an overall evaluation of said predetermined character, said attributes are selected from the group consisting of size, shape, slant, and spacing; and
    a handwriting expert system that compares said attributes with the attributes of a template for said predetermined character, and synthesizes recommendations to said student on how the quality of said predetermined character may be improved and mediates the presentation of a subsequent handwriting lesson.

2. The handwriting instruction system of claim 1 wherein said expert system analyzes said visual handwriting quality attributes based on at least two of the following qualities: size, shape, slant and spacing.

3. The handwriting instruction system of claim 1 wherein said expert system provides customized instruction to said student with respect to at least two of the following qualities: size, shape, slant and spacing.

4. The handwriting instruction system of claim 1 wherein said attribute evaluation system generates said handwriting attributes based on a predetermined handwriting model.

5. The handwriting instruction system of claim 4 wherein said predetermined handwriting model is the D'Nealian handwriting model.

6. The handwriting instruction system of claim 4 wherein said predetermined handwriting model is manuscript handwriting.

7. The handwriting instruction system of claim 4 wherein said predetermined handwriting model is cursive handwriting.

8. The handwriting instruction system of claim 1 further comprising speech module associated with said expert system for generating verbal instruction information to said student.

9. The handwriting instruction system of claim 1 further comprising animation module associated with said expert system for generating animated visual instruction information to said student.

10. The handwriting instruction system of claim 1 further comprising supervisory system for providing guided instructions to said student regarding formation of characters, said supervisory system being coupled to at least one of said acquisition, feature extraction, attribute evaluation and handwriting expert systems and being programmed to train and test said student in formation of a plurality of characters in a systematic fashion.

11. The handwriting instruction system of claim 1 further comprising a digitizing tablet having fastening mechanism for affixing a lesson paper in a predetermined position on said tablet.

12. The handwriting instruction system of claim 11 wherein said fastening mechanism establishes a coordinate system and wherein said acquisition system records pen tip motion information relative to said coordinate system.

13. An article of manufacture according to claim 1 comprising a computer readable medium containing computer program instructions for implementing at least one of said acquisition, feature extraction, attribute evaluation and handwriting expert systems.

* * * * *